(12) United States Patent
Wang et al.

(10) Patent No.: US 10,209,413 B2
(45) Date of Patent: Feb. 19, 2019

(54) COLOR FILTER SUBSTRATE, DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ruiyong Wang, Beijing (CN); Dan Wang, Beijing (CN); Yun Qiu, Beijing (CN); Xiao Sun, Beijing (CN); Jiuxia Yang, Beijing (CN); Bing Bai, Beijing (CN); Xuebo Zhang, Beijing (CN)

(73) Assignees: BOE TECHNOLOGY GROUP CO., LTD. (CN); BEIJING BOE OPTOELECTRONICS TECHNOLOGY CO., LTD. (CN)

(*) Notice: Subject to any disclaimer, the term of this patent is extended or adjusted under 35 U.S.C. 154(b) by 0 days.

(21) Appl. No.: 15/283,569

(22) Filed: Oct. 3, 2016

(65) Prior Publication Data
US 2017/0108630 A1    Apr. 20, 2017

(30) Foreign Application Priority Data
Oct. 15, 2015   (CN) .......................... 2015 1 0665978

(51) Int. Cl.
*G02B 5/22*     (2006.01)
*G02B 5/20*     (2006.01)
(Continued)

(52) U.S. Cl.
CPC .......... *G02B 5/201* (2013.01); *G02F 1/13473* (2013.01); *G02F 1/133514* (2013.01)

(58) Field of Classification Search
CPC ..................... G02F 1/133514; G02F 1/133512
(Continued)

(56) References Cited

U.S. PATENT DOCUMENTS 8,451,414 B2 *   5/2013  Nonaka ............. G02F 1/133514
                                                       349/146

FOREIGN PATENT DOCUMENTS

| CN | 101782697 A | 7/2010 |
| CN | 101849255 A | 9/2010 |
| CN | 101887189 A | 11/2010 |

OTHER PUBLICATIONS

Chinese First Office Action for Chinese Application No. 201510665978.4, dated Jan. 16, 2017, 6 Pages.
(Continued)

*Primary Examiner* — Audrey Y Chang
(74) *Attorney, Agent, or Firm* — Brooks Kushman P.C.

(57) ABSTRACT

A color filter substrate, a display panel and a display device are provided. The color filter substrate includes a plurality of edge pixels. Each edge pixel includes a plurality of subpixels. Each subpixel is divided by the border line into a display portion at the display region and a non-display portion beyond the display region. The non-display portion is covered with a light-shielding layer. The plurality of subpixels includes a standard subpixel and a plurality of to-be-adjusted subpixels. For each to-be-adjusted subpixel, an additional light-shielding layer is provided at the display portion of the to-be-adjusted subpixel, or the light-shielding layer covering the non-display portion of the to-be-adjusted subpixel is provided with at least one aperture.

18 Claims, 2 Drawing Sheets

(51) Int. Cl.
　　　*G02F 1/1347* 　　　(2006.01)
　　　*G02F 1/1335* 　　　(2006.01)
(58) Field of Classification Search
　　　USPC .................. 349/106, 146; 359/885, 892, 891
　　　See application file for complete search history.

(56) References Cited

OTHER PUBLICATIONS

Third Office Action for Chinese Patent Application No. 201510665978. 4, dated Aug. 1, 2017, 5 Pages.

* cited by examiner

COLOR FILTER SUBSTRATE, DISPLAY PANEL AND DISPLAY DEVICE

CROSS-REFERENCE TO RELATED APPLICATIONS

This application claims priority to Chinese patent application No. 201510665978.4 filed on Oct. 15, 2015, which is hereby incorporated by reference in its entirety.

TECHNICAL FIELD

The present disclosure relates to the field of display technology, in particular to a color filter substrate, a display panel and a display device.

BACKGROUND

In a non-rectangular display device in related technology, some pixels may each be divided by a border line of a display region, and these pixels may be referred to as edge pixels. Due to the border line, each edge pixel is divided into a portion located at the display region and a portion located beyond the display region, and the portion located beyond the display region is shielded by a light-shielding layer.

In the non-rectangular display device, there usually exist the following two kinds of border line.

As a first kind, the border line of the display region is a smooth line, so as to ensure the display quality at an edge of an image. However, after the edge pixel is divided by the smooth line, portions of almost all subpixels of the edge pixel located at the display region have different sizes. At this time, the respective subpixels of the edge pixel have different aperture ratios, and a phenomenon of color deviation may occur at the edge of the displayed image.

As a second kind, the border line of the display region consists of a plurality of small segments arranged perpendicular to a row or column direction of pixel units, and each edge pixel is located at the segment perpendicular thereto. At this time, due to the segment, each subpixel of the edge pixel includes two portions with an equal size, i.e., the subpixels have an identical aperture ratio. Although it is able for this kind of border line to provide all subpixels with an identical aperture ratio, a plurality of small step-like structures is formed by these segments, and the resultant step-like border line may adversely affect the display quality at the edge of the image, and thereby adversely affecting the entire display quality of the image.

In a word, for the above-mentioned two non-rectangular display devices, the step-line border line of the display region may readily deteriorate the display quality at the edge of the image, and the smooth border line may readily cause the occurrence of the color deviation. Hence, there is an urgent need to provide the non-rectangular display device with a smooth border line at the display region and meanwhile prevent the occurrence of the color deviation at the edge of the display region.

SUMMARY

The present disclosure provides a color filter substrate, a display panel and a display device, so as to provide a smooth border line at a display region of the color filter substrate and meanwhile prevent the occurrence of color deviation at the edge of the display region.

Technical solutions of the present disclosure are briefly introduced below. In one aspect, the present disclosure provides in some embodiments a color filter substrate, including a plurality of edge pixels. Each edge pixel is divided by a border line of a display region. Each edge pixel includes a plurality of subpixels. Each subpixel is divided by the border line into a display portion at the display region and a non-display portion beyond the display region, and the non-display portion is covered with a light-shielding layer. The plurality of subpixels includes a standard subpixel and a plurality of to-be-adjusted subpixels. For each to-be-adjusted subpixel, an additional light-shielding layer is provided at the display portion of the to-be-adjusted subpixel in such a manner that a difference between an area of the display portion of the to-be-adjusted subpixel and an area of the additional light-shielding layer is equal to an area of the display portion of the standard subpixel, or the light-shielding layer covering the non-display portion of the to-be-adjusted subpixel is provided with at least one aperture in such a manner that a sum of a total area of the at least one aperture and an area of the display portion of the to-be-adjusted subpixel is equal to an area of the display portion of the standard subpixel.

According to the color filter substrate in the embodiments of the present disclosure, each edge subpixel includes one standard subpixel and a plurality of to-be-adjusted subpixels, and each to-be-adjusted subpixel is adjusted on the basis of the standard subpixel so that the area of an actual display portion of the to-be-adjusted subpixel is equal to the area of the display portion of the standard subpixel, i.e., the subpixels of the edge pixel has an identical aperture ratio. To be specific, the additional light-shielding layer may be provided for the display portion of each to-be-adjusted subpixel in such a manner that the difference between the area of the display portion of the to-be-adjusted subpixel and the area of the additional light-shielding layer 3 is equal to the area of the display portion a of the standard subpixel, and/or the light-shielding layer covering the non-display portion of each to-be-adjusted subpixel is provided with at least one aperture in such a manner that the sum of the total area of the at least one aperture and the area of the display portion of the to-be-adjusted subpixel is equal to the area of the display portion of the standard subpixel.

In addition, the border line of the display region of the color filter substrate may be a smooth border line, and each to-be-adjusted subpixel may be adjusted as mentioned above so as to have an aperture ratio identical to the standard subpixel, i.e., all the subpixels of the edge pixel have an identical aperture ratio. As a result, the border line of the display region may be smooth and meanwhile the occurrence of color deviation at the edge of the display region can be prevented.

Optionally, in the plurality of to-be-adjusted subpixels, the additional light-shielding layer is provided at the display portion of a to-be-adjusted subpixel whose display portion has an area greater than that of the display portion of the standard subpixel, and the light-shielding layer covering the non-display portion of a to-be-adjusted subpixel whose display portion has an area smaller than the area of the display portion of the standard subpixel is provided with the at least one aperture.

Optionally, the additional light-shielding layer includes a plurality of light-shielding films distributed evenly at the display portion of the to-be-adjusted subpixel.

Optionally, each of the plurality of light-shielding films is of a circular, fan-like or polygonal shape.

Optionally, the light-shielding layer covering the non-display portion of the to-be-adjusted subpixel is provided with a plurality of evenly-distributed apertures.

Optionally, each of the plurality of apertures is of a circular, fan-like or polygonal shape.

Optionally, each edge pixel includes 3 to 5 subpixels.

Optionally, in each edge pixel, the area of the display portion of the standard pixel is smaller than the area of the display portion of each to-be-adjusted subpixel, or the area of the display portion of the standard pixel greater than the area of the display portion of each to-be-adjusted subpixel.

Optionally, the subpixels of each edge pixel are arranged in a direction substantially identical to a direction in which subpixels of an internal pixel at the display region are arranged.

In another aspect, the present disclosure provides in some embodiments a display panel including the above-mentioned color filter substrate.

In yet another aspect, the present disclosure provides in some embodiments a display device including the above-mentioned display panel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Technical solutions of the present disclosure are described hereinafter in a clear and complete manner in conjunction with the drawings and embodiments. Obviously, the following embodiments merely relate to a part of, rather than all of, the embodiments of the present disclosure, and other embodiments obtained by a person skilled in the art based on these embodiments without any creative effort shall fall within the scope of the present disclosure.

Figure 1:
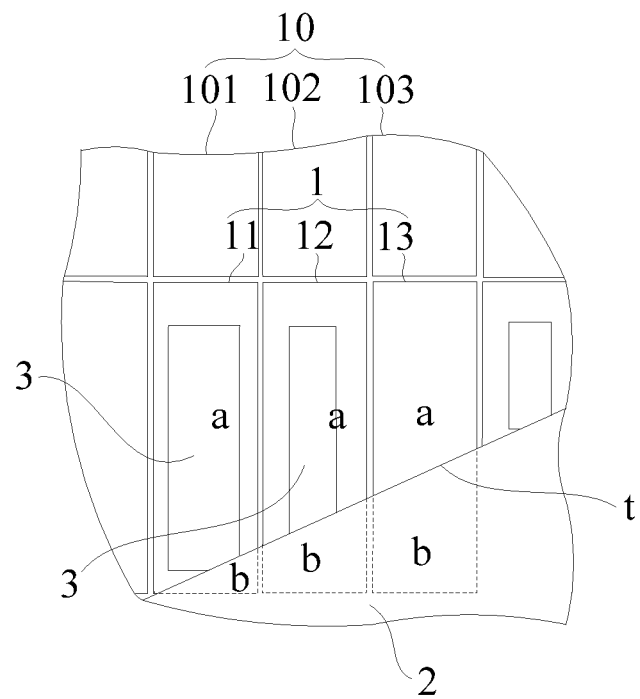
FIG. 1 is a partially schematic view showing an edge of a display region of a color filter substrate according to some embodiments of the present disclosure.
Figure 2:
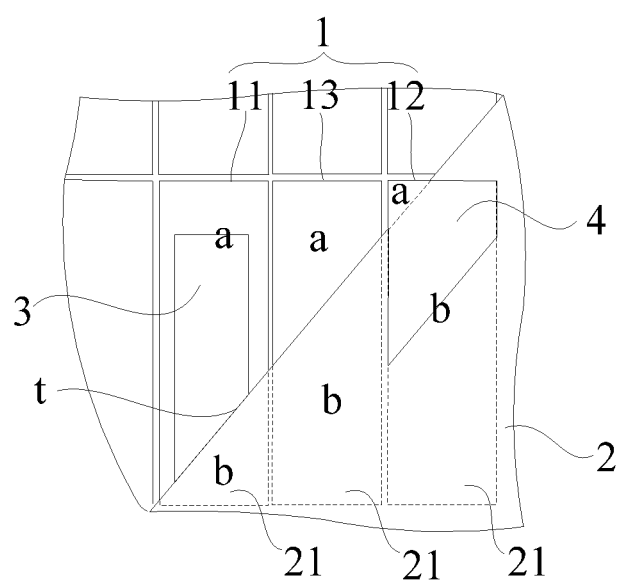
FIG. 2 is a partially schematic view showing an edge of a display region of a color filter substrate according to some embodiments of the present disclosure.
Figure 3:
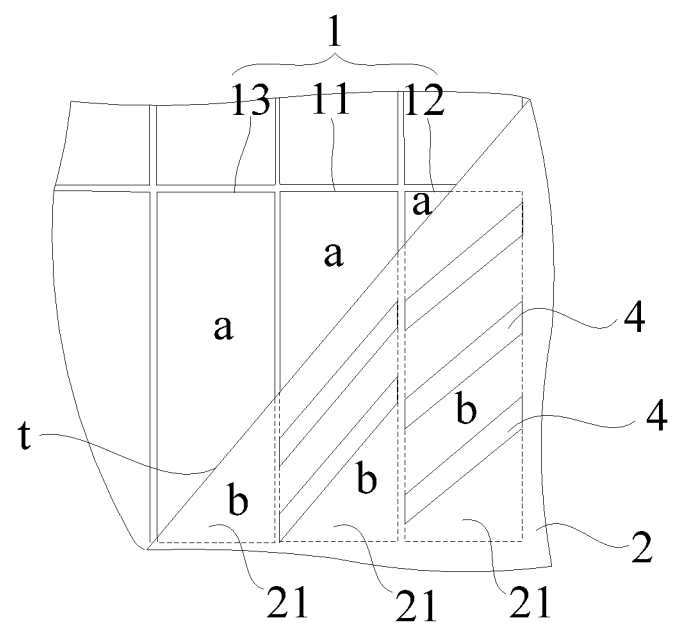
FIG. 3 is a partially schematic view showing an edge of a display region of a color filter substrate according to some embodiments of the present disclosure.

As shown in FIGS. 1-4, the present disclosure provides in some embodiments a color filter substrate, which includes a plurality of edge pixels 1, where each edge pixel 1 is divided by a border line t of a display region. Each edge pixel 1 includes a plurality of subpixels. Each subpixel is divided, by the border line t, into a display portion a at the display region and a non-display portion b beyond the display region, and the non-display portion b is covered with a light-shielding layer. As shown in FIGS. 2-3, the light-shielding layer 21 may be a portion of a black matrix 2 at a non-display region of the color filter substrate. To be specific, the light-shielding layer 21 is a portion of the black matrix 2 that is located at the non-display portion b of the subpixel.

Each edge pixel 1 may include a standard subpixel and a plurality of to-be-adjusted subpixels. As shown in FIGS. 1-4, in the case that each pixel includes three subpixels, the edge pixel 1 may include a standard subpixel 13 and two to-be-adjusted subpixels 11 and 12. An additional light-shielding layer 3 may be provided for the display portion a of each to-be-adjusted subpixel in such a manner that a difference between an area of the display portion a of the to-be-adjusted subpixel and an area of the additional light-shielding layer 3 is equal to an area of the display portion a of the standard subpixel, or the light-shielding layer 21 covering the non-display portion b of the each to-be-adjusted subpixel is provided with at least one aperture 4 in such a manner that a sum of a total area of the at least one aperture 4 and an area of the display portion a of the to-be-adjusted subpixel is equal to an area of the display portion a of the standard subpixel.

According to the color filter substrate in the embodiments of the present disclosure, each edge subpixel 1 includes one standard subpixel 13 and a plurality of to-be-adjusted subpixels (e.g., two to-be-adjusted subpixels 11 and 12), and each to-be-adjusted subpixel is adjusted on the basis of the standard subpixel 13 so that the area of an actual display portion of the to-be-adjusted subpixel is equal to the area of the display portion a of the standard subpixel, i.e., the subpixels of the edge pixel 1 has an identical aperture ratio. To be specific, the additional light-shielding layer 3 may be provided for the display portion a of each to-be-adjusted subpixel in such a manner that the difference between the area of the display portion a of the to-be-adjusted subpixel and the area of the additional light-shielding layer 3 is equal to the area of the display portion a of the standard subpixel 13, or the light-shielding layer 21 covering the non-display portion b of each to-be-adjusted subpixel is provided with at least one aperture 4 in such a manner that the sum of the total area of the at least one aperture 4 and the area of the display portion a of the to-be-adjusted subpixel is equal to the area of the display portion a of the standard subpixel 13.

In addition, the border line t of the display region of the color filter substrate may be a smooth border line, and each to-be-adjusted subpixel may be adjusted as mentioned above so as to have an aperture ratio identical to the standard subpixel 13, i.e., all the subpixels of the edge pixel 1 have an identical aperture ratio. As a result, the border line of the display region may be smooth and meanwhile the occurrence of color deviation at the edge of the display region can be prevented.

It should be appreciated that, any subpixel of each edge pixel 1 may be selected as the standard subpixel. After the selection of the standard subpixel, the other subpixels are just the to-be-adjusted subpixels. In addition, some subpixel of the edge pixel 1 may include the display portion a with an area of 0, i.e., such subpixel is completely located beyond the display region, or some subpixel may include the non-display portion b with an area of 0, i.e., such subpixel is completely located at the display region.

During implementation, the respective to-be-adjusted subpixels of one edge pixel 1 may be adjusted in an identical way or different ways. To be specific, each to-be-adjusted subpixel may be adjusted in the following two ways.

In a first way, for a to-be-adjusted subpixel whose display portion a has an area greater than that of the display portion a of the standard subpixel, an additional light-shielding layer 3 is arranged above the display portion a of the to-beadjusted subpixel. For example, one additional light-shielding layer 3 is provided at each of the display portions of the to-be-adjusted subpixels 11 and 12 in FIG. 1 and the display portion of the to-be-adjusted subpixel 11 in FIG. 2.

In a second way, for a to-be-adjusted subpixel whose display portion a has an area smaller than that of the display portion a of the standard subpixel, the light-shielding layer 21 covering the non-display portion b of the to-be-adjusted subpixel is provided with at least one aperture 4. For example, the light-shielding layers 21 covering the non-display portions b of the to-be-adjusted subpixel 12 in FIG. 2 and the to-be-adjusted subpixels 11 and 12 in FIG. 3 are each provided with at least one aperture 4.

Different to-be-adjusted subpixels in one edge pixel 1 may be adjusted in any of the above two ways according to needs. In the first way, the display portion a of the to-be-adjusted subpixel whose display portion a has an area greater than that of the display portion a of the standard subpixel may be provided with the additional light-shielding layer 3, so as to reduce the area of the actual display portion (i.e., to reduce the aperture ratio), thereby enabling the aperture ratio of the to-be-adjusted subpixel to be identical to that of the standard subpixel. In the second way, the light-shielding layer 21 covering the non-display portion b of the to-be-adjusted subpixel whose display portion a has an area smaller than that of the display portion a of the standard subpixel may be provided with the aperture(s) 4, so as to increase the area of the actual display portion (i.e., to increase the aperture ratio), thereby enabling the aperture ratio of the to-be-adjusted subpixel to be identical to that of the standard subpixel.

In a word, all the to-be-adjusted subpixels of each edge pixel in the color filter substrate may be adjusted in an identical way or different ways. In addition, the adjustment way for each to-be-adjusted subpixel depends on the selection of the standard subpixel, i.e., the structure of each edge pixel depends on the selection of the standard subpixel.

In the edge pixel 1 according to some embodiments of the present disclosure, as shown in FIG. 1, an additional light-shielding layer 3 is provided at the display portion a of the to-be-adjusted subpixel 11 in such a manner that a difference between an area of the display portion a of the to-be-adjusted subpixel 11 and an area of the additional light-shielding layer 3 is equal to an area of the display portion a of the standard subpixel 13, and an additional light-shielding layer 3 is provided at the display portion a of the to-be-adjusted subpixel 12 in such a manner that a difference between an area of the display portion a of the to-be-adjusted subpixel 12 and an area of the additional light-shielding layer 3 is equal to an area of the display portion a of the standard subpixel 13.

Here, the additional light-shielding layers 3 are provided for the to-be-adjusted subpixels 11 and 12, so as to partially shield the display portions a in such a manner that a region of each display portion a that is not shielded by the additional light-shielding layer 3, i.e., an actual display portion, has an area identical to the area of the display portion a of the standard subpixel 13. In this way, the to-be-adjusted subpixels 11 and 12 each have an aperture ratio identical to the standard subpixel, i.e., all the subpixels of the edge pixel 1 have an identical aperture ratio. As a result, it is able to prevent the occurrence of the color deviation at the edge of the display region.

In the edge pixel 1 according to some embodiments of the present disclosure, as shown in FIG. 2, an additional light-shielding layer 3 is provided for the display portion a of the to-be-adjusted subpixel 11 in such a manner that a difference between an area of the display portion a of the to-be-adjusted subpixel 11 and an area of the additional light-shielding layer 3 is equal to an area of the display portion a of the standard subpixel 13, and the light-shielding layer 21 covering the non-display portion b of the to-be-adjusted subpixel 12 is provided with one aperture 4 in such a manner that a sum of an area of the aperture 4 and an area of the display portion a of the to-be-adjusted subpixel 12 is equal to an area of the display portion a of the standard subpixel 13.

Here, the aperture ratio of the to-be-adjusted subpixel 11 may be adjusted in a way identical to the to-be-adjusted subpixels 11 and 12 in FIG. 1, i.e., the aperture ratio of the to-be-adjusted subpixel 11 may be adjusted to be identical to that of the standard subpixel 13 by providing the additional light-shielding layer 3. For the to-be-adjusted subpixel 12 in FIG. 2, the light-shielding layer 21 covering the non-display portion b thereof is provided with the aperture 4, through which light may pass, in such a manner that a sum of the area of the aperture 4 and the area of the display portion a, i.e., an area of the actual display portion, is equal to the area of the display portion a of the standard subpixel 13, so as to enable the aperture ratio of the to-be-adjusted subpixel 12 to be identical to that of the standard subpixel 13.

In the edge pixel 1 according to some embodiments of the present disclosure, as shown in FIG. 3, the light-shielding layer 21 covering the non-display portion b of the to-be-adjusted subpixel 11 is provided with two apertures 4 in such a manner that a sum of a total area of the two apertures 4 and an area of the display portion a of the to-be-adjusted subpixel 11 is equal to an area of the display portion a of the standard subpixel 13, and the light-shielding layer 21 covering the non-display portion b of the to-be-adjusted subpixel 12 is provided with three apertures 4 in such a manner that a sum of a total area of the three apertures 4 and an area of the display portion a of the to-be-adjusted subpixel 12 is equal to an area of the display portion a of the standard subpixel 13.

Here, the aperture ratios of the two to-be-adjusted subpixels 11 and 12 may be adjusted in a way identical to the to-be-adjusted subpixel 12 in FIG. 2, i.e., the light-shielding layer 21 covering the corresponding non-display portion b may be provided with the apertures 4, through which light may pass, so as to enable the sum of the total area of the apertures 4 and the area of the display portion a, i.e., the area of the actual display portion, to be identical to the area of the display portion a of the standard subpixel 13, thereby enabling the aperture ratio of each of the to-be-adjusted subpixels 11 and 12 to be identical to that of the standard subpixel 13.

In an optional embodiment on the basis of the above embodiments of the present disclosure, the area of the display portion of the standard pixel is smaller than the area of the display portion of each to-be-adjusted subpixel, or the area of the display portion of the standard pixel is greater than the area of the display portion of each to-be-adjusted subpixel.

In the case that in each edge pixel, like the edge pixel 1 in FIG. 1, the area of the display portion a of the standard subpixel 13 is smaller than the area of the display portion a of each to-be-adjusted subpixel (e.g., the to-be-adjusted subpixels 11 and 12), the aperture ratio of the to-be-adjusted subpixel may be identical to that of the standard subpixel 13 by merely providing the additional light-shielding layer 3 at the display portion a of the to-be-adjusted subpixel. In the case that in each edge pixel, like the edge pixel 1 in FIG. 3, the area of the display portion a of the standard subpixel 13 is greater than the area of the display portion a of each to-be-adjusted subpixel (e.g., the to-be-adjusted subpixels 11 and 12), the aperture ratio of the to-be-adjusted subpixel may be identical to that of the standard subpixel 13 by merely providing the light-shielding layer 21, which covers the non-display portion b of the to-be-adjusted subpixel, with the aperture(s). In these two cases, all the to-be-adjusted subpixels may be adjusted in an identical way, i.e., each to-be-adjusted subpixel may be manufactured by an identical process, thereby simplifying the manufacture of the color filter substrate.

Figure 4:
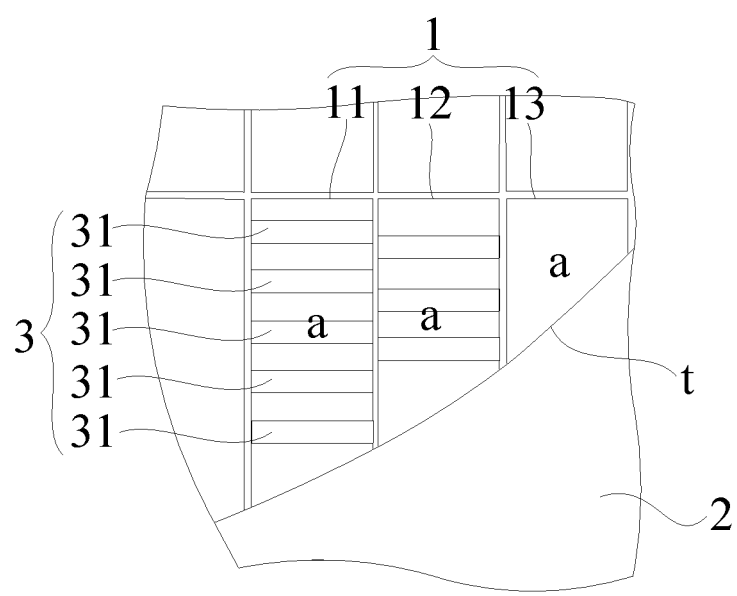
FIG. 4 is a partially schematic view showing an edge of a display region of a color filter substrate according to some embodiments of the present disclosure.

As shown in FIG. 4, in some embodiments on the basis of the foregoing embodiments of the present disclosure, the additional light-shielding layer 3 may include a plurality of light-shielding films 31. Optionally, the light-shielding films 31 may be distributed evenly at the display portion a of the to-be-adjusted subpixel. Since the plurality of light-shielding films 31 forming the whole additional light-shielding layer 3 is evenly distributed and each light-shielding film 31 may have a very small area, it is able to prevent the occurrence of dark spots at the display region, thereby ensuring an even display brightness of the edge pixel 1.

Optionally, each of the plurality of light-shielding films 31 may be of a circular, fan-like or polygonal shape. Of course, the shape of the light-shielding film 31 may not be limited to the above, and during the manufacture, the light-shielding film 31 may be of any shape formed by straight lines, a curve or a combination of a straight line and a curve.

As shown in FIG. 3, in some embodiments on the basis of the foregoing embodiments of the present disclosure, the light-shielding layer 21 covering the non-display portion b of the to-be-adjusted subpixel (e.g., the to-be-adjusted subpixel 11 or 12) may be provided with a plurality of evenly-distributed apertures 4, and each aperture 4 may have a very small area. As a result, it is able to prevent the occurrence of dark spots at the display region, thereby ensuring an even display brightness of the edge pixel 1.

Optionally, each of the plurality of apertures 4 may be of a circular, fan-like or polygonal shape. Of course, the shape of the aperture 4 may not be limited to the above, and during the manufacture, the aperture 4 may be of any shape formed by straight lines, a curve or a combination of a straight line and a curve.

As shown in FIGS. 1-4, in some embodiments of the present disclosure, each edge pixel 1 may include 3 to 5 subpixels. Optionally, each edge pixel 1 includes 3 subpixels, i.e., a red subpixel, a green subpixel and a blue subpixel.

In the color filter substrate as shown in FIG. 1, in some embodiments on the basis of the foregoing embodiments of the present disclosure, the subpixels of each edge pixel 1 are arranged in a direction substantially identical to a direction in which subpixels (e.g., subpixels 101, 102 and 103) of an internal pixel 10 at the display region are arranged. In other words, the arrangement and structure of the edge pixels of the color filter substrate in the present disclosure may be identical to the arrangement and structure of the pixels in a common display panel in related technology.

The present disclosure further provides in some embodiments a display panel including the above-mentioned color filter substrate.

The present disclosure further provides in some embodiments a display device including the above-mentioned display panel.

According to the display panel and the display device in the embodiments of the present disclosure, it is able to provide the smooth border line at the display region of the color filter substrate and meanwhile prevent the occurrence of color deviation at the edge of the display region.

The above are merely the preferred embodiments of the present disclosure. Obviously, a person skilled in the art may make further modifications and improvements without departing from the spirit of the present disclosure, and these modifications and improvements are also included by the present disclosure if they fall within the scope of claims of the present disclosure and equivalent technologies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A color filter substrate, comprising a plurality of edge pixels, wherein each edge pixel is divided by a border line of a display region, each edge pixel comprises a plurality of subpixels, each subpixel is divided by the border line into a display portion at the display region and a non-display portion beyond the display region, and the non-display portion is covered with a light-shielding layer;

the plurality of subpixels comprises a standard subpixel and a plurality of to-be-adjusted subpixels; and for each to-be-adjusted subpixel, an additional light-shielding layer is provided at the display portion of the to-be-adjusted subpixel in such a manner that a difference between an area of the display portion of the to-be-adjusted subpixel and an area of the additional light-shielding layer is equal to an area of the display portion of the standard subpixel, or the light-shielding layer covering the non-display portion of the to-be-adjusted subpixel is provided with at least one aperture in such a manner that a sum of a total area of the at least one aperture and an area of the display portion of the to-be-adjusted subpixel is equal to an area of the display portion of the standard subpixel;

wherein the additional light-shielding layer comprises a plurality of light-shielding films distributed evenly at the display portion of the to-be-adjusted subpixel.

2. The color filter substrate according to claim 1, wherein each of the plurality of light-shielding films is of a circular, fan-like or polygonal shape.

3. The color filter substrate according to claim 1, wherein the light-shielding layer covering the non-display portion of the to-be-adjusted subpixel is provided with a plurality of evenly-distributed apertures.

4. The color filter substrate according to claim 3, wherein each of the plurality of apertures is of a circular, fan-like or polygonal shape.

5. The color filter substrate according to claim 1, wherein each edge pixel comprises 3 to 5 subpixels.

6. The color filter substrate according to claim 1, wherein in each edge pixel, the area of the display portion of the standard subpixel is smaller than the area of the display portion of each to-be-adjusted subpixel, or the area of the display portion of the standard subpixel greater than the area of the display portion of each to-be-adjusted subpixel.

7. The color filter substrate according to claim 1, wherein the subpixels of each edge pixel are arranged in a direction substantially identical to a direction in which subpixels of an internal pixel at the display region are arranged.

8. The color filter substrate according to claim 1, wherein each of the plurality of light-shielding films is set to be a shape formed by a curve.

9. A display panel, comprising a color filter substrate, wherein the color filter substrate comprises a plurality of edge pixels, each edge pixel is divided by a border line of a display region, each edge pixel comprises a plurality of subpixels, each subpixel is divided by the border line into a display portion at the display region and a non-display portion beyond the display region, and the non-display portion is covered with a light-shielding layer;

the plurality of subpixels comprises a standard subpixel and a plurality of to-be-adjusted subpixels; and for each to-be-adjusted subpixel, an additional light-shielding layer is provided at the display portion of the to-be-adjusted subpixel in such a manner that a difference between an area of the display portion of the to-be-adjusted subpixel and an area of the additional light-shielding layer is equal to an area of the display portion of the standard subpixel, or the light-shielding layer covering the non-display portion of the to-be-adjusted subpixel is provided with at least one aperture in such a manner that a sum of a total area of the at least one aperture and an area of the display portion of the to-be-adjusted subpixel is equal to an area of the display portion of the standard subpixel;

wherein the additional light-shielding layer comprises a plurality of light-shielding films distributed evenly at the display portion of the to-be-adjusted subpixel.

10. The display panel according to claim 9, wherein each of the plurality of light-shielding films is of a circular, fan-like or polygonal shape.

11. The display panel according to claim 9, wherein the light-shielding layer covering the non-display portion of the to-be-adjusted subpixel is provided with a plurality of evenly-distributed apertures.

12. The display panel according to claim 11, wherein each of the plurality of apertures is of a circular, fan-like or polygonal shape.

13. The display panel according to claim 9, wherein each edge pixel comprises 3 to 5 subpixels.

14. The display panel according to claim 9, wherein in each edge pixel, the area of the display portion of the standard subpixel is smaller than the area of the display portion of each to-be-adjusted subpixel, or the area of the display portion of the standard subpixel greater than the area of the display portion of each to-be-adjusted subpixel.

15. The display panel according to claim 9, wherein the subpixels of each edge pixel are arranged in a direction substantially identical to a direction in which subpixels of an internal pixel at the display region are arranged.

16. The display panel according to claim 9, wherein each of the plurality of light-shielding films is set to be a shape formed by a curve.

17. A display device, comprising a display panel which comprises a color filter substrate, wherein the color filter substrate comprises a plurality of edge pixels, wherein each edge pixel is divided by a border line of a display region, each edge pixel comprises a plurality of subpixels, each subpixel is divided by the border line into a display portion at the display region and a non-display portion beyond the display region, and the non-display portion is covered with a light-shielding layer;

the plurality of subpixels comprises a standard subpixel and a plurality of to-be-adjusted subpixels; and for each to-be-adjusted subpixel, an additional light-shielding layer is provided at the display portion of the to-be-adjusted subpixel in such a manner that a difference between an area of the display portion of the to-be-adjusted subpixel and an area of the additional light-shielding layer is equal to an area of the display portion of the standard subpixel, or the light-shielding layer covering the non-display portion of the to-be-adjusted subpixel is provided with at least one aperture in such a manner that a sum of a total area of the at least one aperture and an area of the display portion of the to-be-adjusted subpixel is equal to an area of the display portion of the standard subpixel;

wherein the additional light-shielding layer comprises a plurality of light-shielding films distributed evenly at the display portion of the to-be-adjusted subpixel.

18. The display device according to claim 17, wherein each of the plurality of light-shielding films is set to be a shape formed by a curve.

* * * * *